US012776840B2

(12) United States Patent
Debenedetti et al.

(10) Patent No.: US 12,776,840 B2
(45) Date of Patent: Oct. 27, 2026

(54) FREE SPACE OPTIC NETWORK

(71) Applicant: TELEFONAKTIEBOLAGET LM ERICSSON (PUBL), Stockholm (SE)

(72) Inventors: Paolo Debenedetti, Genoa (IT); Roberto Magri, Genoa (IT); Fabio Cavaliere, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 158 days.

(21) Appl. No.: 18/704,297

(22) PCT Filed: Oct. 25, 2021

(86) PCT No.: PCT/EP2021/079577

§ 371 (c)(1),
(2) Date: Apr. 24, 2024

(87) PCT Pub. No.: WO2023/072367

PCT Pub. Date: May 4, 2023

(65) Prior Publication Data

US 2025/0023638 A1 Jan. 16, 2025

(51) Int. Cl.
*H04B 10/112* (2013.01)
*H04B 10/2575* (2013.01)

(52) U.S. Cl.
CPC ..... *H04B 10/1123* (2013.01); *H04B 10/1129* (2013.01); *H04B 10/25755* (2013.01)

(58) Field of Classification Search
CPC . B62M 1/14; B62M 1/18; B62M 1/24; B62M 1/36; B62M 3/02; B62M 3/08;
(Continued)

(56) References Cited

U.S. PATENT DOCUMENTS 7,116,910 B1 * 10/2006 Presby ................. G02B 6/4246 398/118
7,295,777 B1 * 11/2007 Britz ................... H04J 14/0307 398/118

(Continued)

FOREIGN PATENT DOCUMENTS

AU 2001292558 A1 * 5/2002

OTHER PUBLICATIONS

Sorin Tibuleac,: "Transmission Impairments in DWDM Networks With Reconfigurable Optical Add-Drop Multiplexers," Feb. 10, 2010, Journal of Lightwave Technology, vol. 28, No. 4, Feb. 15, 2010, pp. 557-565.*

(Continued)

*Primary Examiner* — Omar S Ismail
(74) *Attorney, Agent, or Firm* — Sage Patent Group

(57) ABSTRACT

The present application relates to a free space optic (FSO) network node that includes a first receiving module configured to receive a first FSO signal comprising a first set of multiplexed wavelengths from a first direction and a second receiving module configured to receive a second FSO signal including a second set of multiplexed wavelengths from a second direction. The FSO network node further includes a first wavelength selective device configured to drop a first subset of wavelengths from the first set of multiplexed wavelengths and a second wavelength selective device configured to drop a second subset of wavelengths from the second set of multiplexed wavelengths. The present application also relates to another FSO network node, a method and a FSO ring network.

14 Claims, 7 Drawing Sheets

(58) Field of Classification Search

CPC . B62M 6/10; B62M 6/40; B62M 6/80; B62M 7/02; B62M 9/04; B62M 11/04; B62M 23/02; B62M 25/02; B62M 6/45; B62M 6/50; H04B 10/112; H04B 10/2575; H04B 10/1123; H04B 10/1129; H04B 10/25755; H04B 1/0003; H04B 1/005; H04B 1/02; H04B 1/06; H04B 1/38; H04B 1/62; H04B 1/66; H04B 1/69; H04B 1/74; H04B 3/02; H04B 3/54; H04B 5/20; H04B 5/40; H04B 5/70; H04B 7/02; H04B 7/14; H04B 7/24; H04B 10/03; H04B 10/07; H04B 10/11; H04B 10/073; H04B 10/075; H04B 10/2507; H04B 10/25752; H04B 10/25753; H04B 10/25758; H04B 10/2589; H04B 10/27; H04B 10/29; H04B 10/50; H04B 10/60; H04B 10/80; H04B 10/272; H04B 10/275; H04B 10/291; H04B 10/501; H04B 10/516; H04B 10/58; H04B 14/002; H04B 14/02; H04B 15/02; H04B 17/40; H04B 17/30; H04B 17/20; H04B 17/10; H04B 17/0082; H04B 2201/69; H04B 2203/54; H04B 2210/07; H04B 2210/25; H04B 2215/064; H04B 2215/061

See application file for complete search history.

(56) References Cited

U.S. PATENT DOCUMENTS 7,295,783 B2 * 11/2007 Singh ..................... B82Y 20/00 398/175
7,565,084 B1 * 7/2009 Wach ..................... H04J 14/04 398/201
8,937,759 B2 * 1/2015 Holmes ..................... G02B 5/32 359/9
11,546,062 B1 * 1/2023 Moro ..................... H04B 10/505
2002/0114030 A1 * 8/2002 Dwivedi ............. H04J 14/0238 398/58
2003/0025956 A1 2/2003 Li et al.
2003/0031404 A1 * 2/2003 Pedersen ............ G02B 6/29353 385/24
2003/0081281 A1 * 5/2003 DeCusatis ............... H04J 14/02 398/79
2003/0081294 A1 * 5/2003 Lee ..................... H04B 10/11 398/126
2003/0215231 A1 * 11/2003 Weston-Dawkes ..................... H04J 14/0295 398/19
2005/0094255 A1 * 5/2005 Stephens .............. H04B 10/298 359/337.5
2006/0139735 A1 * 6/2006 Caplan ................... H04B 10/67 359/325
2007/0216988 A1 * 9/2007 Caplan ................. H04B 10/677 359/325
2008/0074732 A1 * 3/2008 Stephens ............ H04B 10/2941 359/334
2013/0163991 A1 * 6/2013 Yu ...................... H04B 10/1129 398/72
2014/0153928 A1 * 6/2014 Yu ...................... H04B 10/1129 398/115
2014/0226976 A1 * 8/2014 Britz .................. H04B 10/0795 398/25
2014/0376914 A1 * 12/2014 Miniscalco ........ H04B 10/1129 398/58
2016/0248535 A1 * 8/2016 Larikova .............. H04B 10/801
2017/0026095 A1 * 1/2017 Ashrafi .................... H04B 7/10
2017/0343750 A1 * 11/2017 Ashrafi ................ G01M 11/085
2017/0346559 A1 * 11/2017 Eroglu ............. H04B 10/07953
2019/0058242 A1 * 2/2019 Tabe ...................... H01Q 1/248
2020/0195343 A1 6/2020 Solanki
2020/0304204 A1 * 9/2020 Syed .................... H04B 10/032
2020/0328811 A1 * 10/2020 Mertz .............. H04B 10/07953
2021/0003784 A1 * 1/2021 Renshaw ............. G02B 6/3596
2021/0133614 A1 * 5/2021 Ashrafi ...................... G02F 3/00
2021/0143904 A1 * 5/2021 Rao ..................... H04J 14/0291

OTHER PUBLICATIONS

Yiran Ma,"Recent Progress of Wavelength Selective Switch," Feb. 16, 2021, Journal of Lightwave Technology, vol. 39, No. 4, Feb. 15, 2021,pp. 896-902.*
Roland Ryf et al.,"Physical Layer Transmission and Switching Solutions in Support of Spectrally and Spatially Flexible Optical Networks," Feb. 19, 2015, IEEE Communications Magazine ,vol. 53, Issue: 2,Feb. 2015,pp. 52-58.*
Klaus Grobe,"Optical Wavelength-Division Multiplexing for Data Communication Networks," Aug. 23, 2013, Handbook of Fiber Optic Data Communication,2013,Chapter 5, pp. 85-117.*
Wenfeng Xia et al.,"A Survey on Data Center Networking (DCN): Infrastructure and Operations," Feb. 22, 2017, IEEE Communications Surveys & Tutorials, vol. 19, No. 1, First Quarter 2017, pp. 640-652.*
David T. Neilson et al.,"Wavelength Selective Switching for Optical Bandwidth Management," Summer 2006, Bell Labs Technical Journal 11(2), 105-128 (2006),pp. 106-113.*
Dan M. Marom et al.,"Survey of Photonic Switching Architectures and Technologies in Support of Spatially and Spectrally Flexible Optical Networking," Dec. 15, 2016, Optical Communication Network, vol. 9, No. 1,Jan. 2017,pp. 1-21.*
Ehsan Bayaki et al.,"EDFA-Based All-Optical Relaying in Free-Space Optical Systems," Feb. 10, 2012, IEEE Transactions on Communications, vol. 60, No. 12, Dec. 2012,pp. 3797-3800.*
Bayaki, E. et al.; "EDFA-Based All-Optical Relaying in Free-Space Optical Systems"; IEEE Transactions on Communications, vol. 60, No. 12; Dec. 2012; pp. 3797-3807 (11 pages).
International Search Report and Written Opinion mailed Jul. 25, 2022 for International Application No. PCT/EP2021/079577, 11 pages.

* cited by examiner

FREE SPACE OPTIC NETWORK

CROSS-REFERENCE TO RELATED APPLICATIONS

This application is a 35 U.S.C. § 371 national stage application for International Application No. PCT/EP2021/079577, entitled "FREE SPACE OPTIC NETWORK", filed on Oct. 25, 2021, the disclosures and contents of which are hereby incorporated by reference in their entireties.

TECHNICAL FIELD

The present application relates to a free space optic (FSO) network node, a method performed by a FSO network node and a FSO ring network.

BACKGROUND

Free space optics (FSO) is emerging as a high-capacity transport technology for backhaul and fronthaul applications in 6G radio access networks (RAN). FSO provides a number of promising advantages including: the ability to use unlicensed spectra, ultra-high bandwidth, robustness to Electro Magnetic Interference (EMI) and privacy of the signals thanks to the spatial diversity and segregation of optical laser beams in free space. Examples of known FSO systems and their characteristics are listed in Table 1 below:

TABLE 1

| FSO System | fSONA (Canada) | AOptix (USA) | Artolink (Russia) |
|---|---|---|---|
| Model | 1250-M | MB-2000 | M1-10GE |
| Wavelength | 1550 nm | 1550 nm | 1550 nm |
| Data rate | 1.25 Gbit/s | 2 Gbit/s | 10 Gbit/s |
| Apertures | 4 Tx + 1 Rx (20 cm) | 1 Tx/Rx | 1 Tx + 1 Rx |
| Tx-Power | 4 × 160 mW | 500 mW | ? |
| Laser class | 1M | 1M | 1M |
| Distance | 3.9 km (3 dB/km) | 10 km (carrier class) | 500 m 99.9% availability |
| Auto tracking | No (?) | Yes | Yes |
| Weight | 28 kg | 82 kg | 8 kg |
| Interface | Optical: SM, MM LC | Optical: SFP, 1000Base SM, MM LC | 20-Port GbE (100M/1 G)SFP 4 TP/(100/1 G) SFP Combo 3-Port 1 G/10 G SFP+ |

Measurements performed at the Heinrich Hertz Institute in Berlin have demonstrated that the availability of a FSO link is 99.99% over 200 m. This property means that FSO links are a promising candidate for mobile backhaul or fixed wireless access. A drawback which has limited the use of FSO networks, however, is that FSO links are sensitive to changing environmental conditions. Haze and foggy conditions can affect the availability of an FSO link, while mmWaves face challenges in rainy conditions. A hybrid solution, involving both FSO links and mmWaves, can be used to increase the link reliability. High data rates over longer distances with 99.999% availability can be achieved with FSO combined with mmWaves.

FSO technology thus presents a promising communication technology due to the high spectrum availability. However, the advantages that can be provided by FSO systems are also very dependent on ideal free space conditions, such as full line-of-sight availability, antenna alignment, obstacles (static or dynamic) and air conditions (humidity and illumination). These issues mean that the reliability of a successful transmission over an FSO link may be relatively low and thus the use of FSO as a viable large scale communication technology has been limited.

Reliability in an FSO network is typically improved by using redundancy links and paths, duplicating transmitters and receivers used in the FSO network and adding signal repeaters.

FIG. 1 illustrates an FSO network 100 arranged around a plurality of buildings 101*a-f*. The FSO network 100 comprises a series of point-to-point configurations between pairs of network nodes positioned on the buildings. Thus, each building 101 comprises a pair of network nodes. For example, the second building 101*b* comprises a pair of network nodes 102*a-b*.

Each network node 102 communicates using FSO signals with a network node 102 on the adjacent building. A received FSO signal is converted into electrical format for processing and provided to the other network node of the pair for onward transmission as an FSO signal around the network 100. For example, network node 102*a* receives an FSO signal from a network node on building 101*a*. This FSO signal is converted to the electrical domain and passed to network node 102*b* for onward transmission to a network node on building 101*c*.

The active components present in each network node 102 to provide the appropriate electrical conversion of the signal can increase the cost of implementing FSO network 100. Furthermore, the FSO network is not fully transparent to the client signals due to the conversion of the optical FSO signals to and from the electrical domain, which is disadvantageous from a security and synchronization perspective.

Non-line-of-sight FSO network nodes may be connected by intermediate FSO repeaters. For example, referring again to FIG. 1, a line of sight (LOS) between a network node on building 101*a* and a network node on building 101*f* may be impeded by a blockage 104. The network 100 thus further comprises an optical repeater 103, which is configured to transmit FSO signals between the network nodes on buildings 101*a* and 101*f*, thereby avoiding the line-of-sight blockage 104. However, optical repeater 103 may also perform optical-to-electrical-to-optical conversion of a signal.

The paper entitled "EDFA-Based All-Optical Relaying in Free-Space Optical Systems," by E. Bayaki, D. S. Michalopoulos and R. Schober, in IEEE Transactions on Communications, vol. 60, no. 12, pp. 3797-3807, December 2012 describes a technique by which link failures in an FSO network can be mitigated. The paper describes that protection against a link failure is provided by space switching an FSO signal to a different FSO repeater, which is in the line of sight of the transmitting network node. This solution requires dedicating bandwidth and energy resources to signals that pass through a repeater because they are destined to a remote FSO terminal, where the signal at the repeater may also need to be converted into the electrical domain for processing.

SUMMARY

Examples according to the present disclosure therefore aim to provide an FSO network node, a method and an FSO network that at least partially address one or more of the challenges discussed above.

According to a first aspect there is provided a free space optic (FSO) network node that comprises a first receiving module configured to receive a first FSO signal comprising a first set of multiplexed wavelengths from a first direction and a second receiving module configured to receive a second FSO signal comprising a second set of multiplexed wavelengths from a second direction. The FSO network node further comprises a first wavelength selective device configured to drop a first subset of wavelengths from the first set of multiplexed wavelengths and a second wavelength selective device configured to drop a second subset of wavelengths from the second set of multiplexed wavelengths.

According to a second aspect there is provided a method performed by a FSO network node according to the first aspect. The method comprises monitoring the first subset of wavelengths received at the first receiving module; monitoring the second subset of wavelengths received at the second receiving module; blocking, using the first wavelength selective device, a third subset of wavelengths from the first set of multiplexed wavelengths corresponding to the second subset of wavelengths dropped by the second wavelength selective device; and blocking, using the second wavelength selective device, a fourth subset of wavelengths from the second set of multiplexed wavelengths corresponding to the first subset of wavelengths dropped by the first wavelength selective device.

According to a third aspect there is provided a FSO network node that comprises a first receiving module configured to receive a first FSO signal comprising a first set of multiplexed wavelengths from a first direction and a second receiving module configured to receive a second FSO signal from a second direction comprising a second set of multiplexed wavelengths. The FSO network node further comprises a first optical coupling module configured to act on the first FSO signal, and configurable to add a first subset of wavelengths to the first set of multiplexed wavelengths to form an adapted first FSO signal and a second optical coupling module configured to act on the second FSO signal, and configurable to add a second subset of wavelengths to the second set of multiplexed wavelengths to form an adapted second FSO signal. The FSO network node further comprises a first transmitting module configured to transmit the adapted first FSO signal in the first direction and a second transmitting module configured to transmit the adapted second FSO signal in the second direction.

According to a fourth aspect there is provided a FSO ring network that comprises at least one master node comprising the FSO node of the first aspect; and at least one slave node comprising the FSO node of the third aspect.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
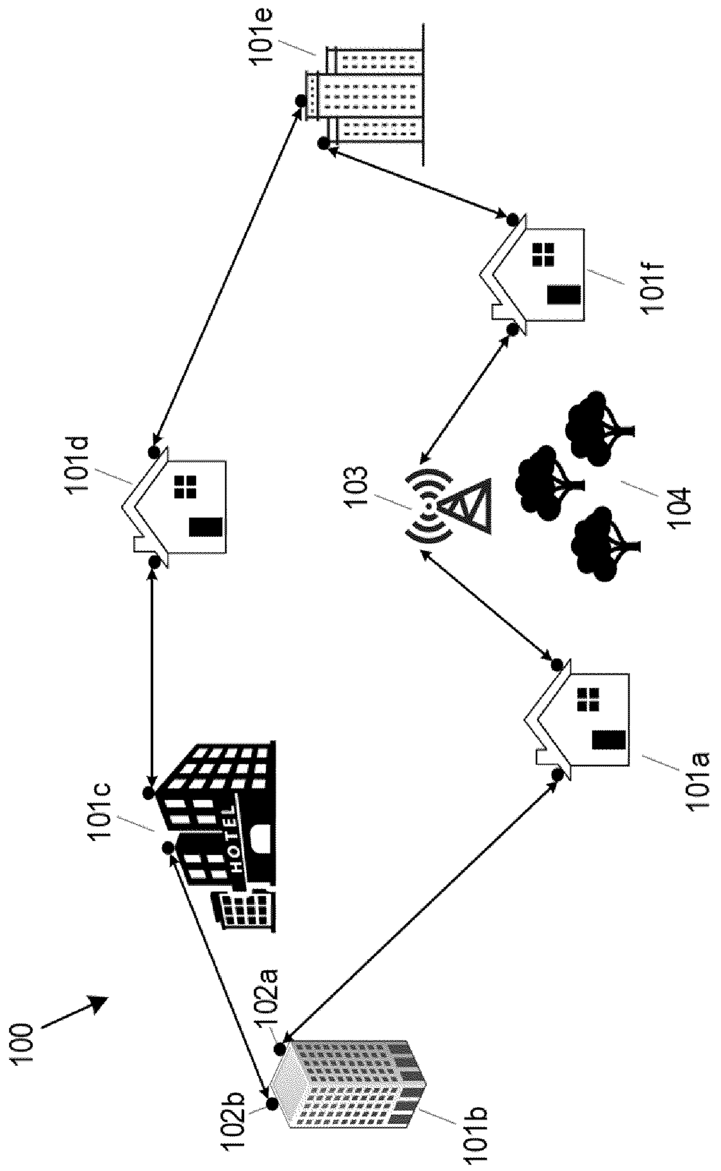
FIG. 1 is an example of an FSO network.

Known FSO systems, for example, those specified above in Table 1, operate at 1550 nm, which is in the same wavelength range used in wavelength division multiplexing (WDM) systems, conventionally implemented in optical fibres. As FSO networks can operate over a similar wavelength range to WDM optical fibre systems, this can lead to the possibility that WDM technology can be implemented in FSO systems as a method to support spatial and frequency diversity in the FSO links. In particular, the possibility of passing signals from node to node in the optical domain, without terminating and processing the corresponding electrical signal, would give great benefits in terms of cost and available bandwidth.

The present application thus relates to an FSO network which utilizes wavelength division multiplexing (WDM) technology in the transmission of FSO signals between nodes in the FSO network. By utilizing WDM technology, wavelengths may be added to, or dropped from, an FSO signal comprising multiplexed wavelengths at an FSO network node in the optical domain, thus avoiding the optical-to-electrical-to-optical conversion that occurs at nodes in conventional FSO networks. Each FSO network node may therefore comprise one or more optical wavelength selective devices operable to add, drop or pass wavelengths of an FSO signal. In some examples, one or more nodes of the FSO network may thus effectively act as reconfigurable optical add-drop multiplexers (ROADMs), which can act on FSO signals.

In one example, the FSO network is a ring FSO network comprising at least one master node and at least one slave node. In such a network configuration, the slave node may be configured to transmit wavelengths in both directions around the ring network, which may comprise a first FSO signal travelling in one direction and a second FSO signal travelling in the opposite direction. Additional slave nodes in the FSO ring network may add additional wavelengths to the first or second FSO signals using their respective wavelength selective devices. The master node may thus comprise a first receiving module configured to receive the first FSO signal and a second receiving module configured to receive the second FSO signal.

The master node may further comprise a first and a second wavelength selective device configured to drop a subset of wavelengths from the first and second FSO signals, respectively. In one example, the master node may be configured to drop wavelengths received on either the first or second receiving module, and transmit these dropped wavelengths to a processing module at the master node or to a network node (e.g. in the core network) for further processing. In one example, the master node may receive a first wavelength at the first receiving module and the same first wavelength on the second receiving module. If both wavelengths were dropped together for further processing, this may cause interference as they are using the same wavelength for transmission. Therefore, in some examples, a wavelength first received at the first receiving module may be dropped by the first wavelength selective device, of the master node, for further processing and the same wavelength received at the second receiving module may be blocked by the second wavelength selective device such that it is not dropped for further processing. In this way, the interference that may be caused by processing the same wavelength may be avoided.

Figure 2:
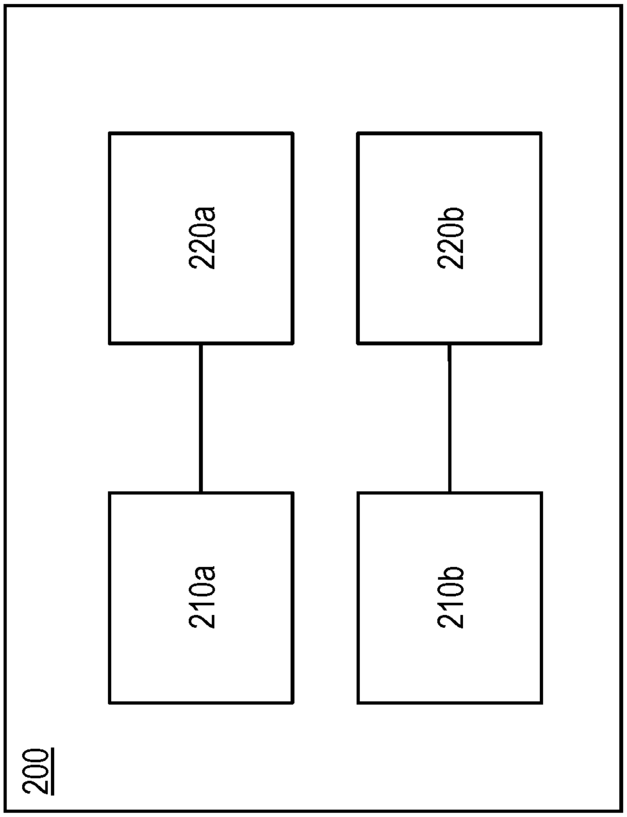
FIG. 2 is a block diagram illustrating functional modules in an example FSO network node.

FIG. 2 is a block diagram illustrating functional modules in an FSO network node 200, which may be operable as a master node or a slave node. The FSO network node 200 comprises a first receiving module 210_a_ configured to receive a first FSO signal comprising a first set of multiplexed wavelengths from a first direction and a second receiving module 210_b_ configured to receive a second FSO signal comprising a second set of multiplexed wavelengths from a second direction. The first and second set of multiplexed wavelengths may each comprise one or more wavelengths.

FSO network node 200 further comprises a first wavelength selective device 220*a* configured to drop a first subset of wavelengths from the first set of multiplexed wavelengths and a second wavelength selective device 220*b* configured to drop a second subset of wavelengths from the second set of multiplexed wavelengths. In examples according to the present disclosure, a 'subset of wavelengths' may comprise one or more wavelengths. In some examples, the first set of multiplexed wavelengths and the second set of multiplexed wavelengths may each comprise the same set of wavelengths and an aggregate of the first subset of wavelengths and the second subset of wavelengths may comprise each wavelength of the set of wavelengths. In some examples, the first wavelength selective device 220*a* comprises a first wavelength selective switch (WSS) and the second wavelength selective device 220*b* comprises a second WSS. In some examples, the first and second WSS may comprise electrochromic or micro-electromechanical system (MEMS) components.

Figure 3:
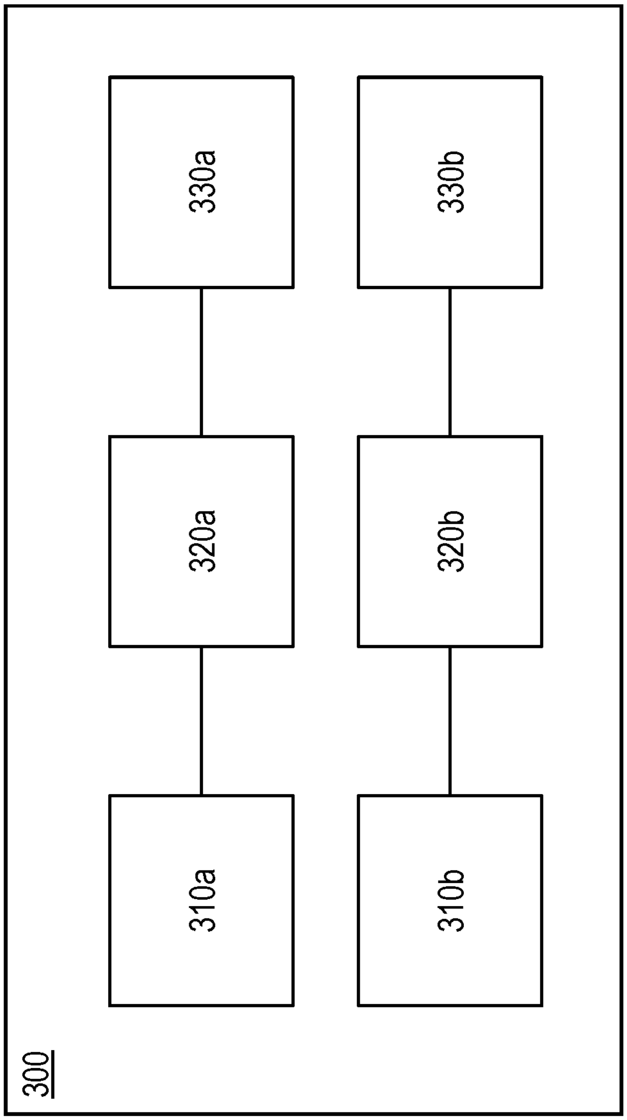
FIG. 3 is a block diagram illustrating functional modules in another example FSO network node.

FIG. 3 is a block diagram illustrating functional modules in another FSO network node 300 which may be operable as a master node or a slave node. FSO network node 300 comprises a first receiving module 310*a* configured to receive a first FSO signal comprising a first set of multiplexed wavelengths and a second receiving module 310*b* configured to receive a second FSO signal comprising a second set of multiplexed wavelengths.

The FSO network node 300 further comprises a first wavelength selective device 320*a* configured to act on the first FSO signal, and configurable to add a subset of wavelengths to the first set of multiplexed wavelengths to form an adapted first FSO signal and a second wavelength selective device 320*b* configured to act on the second FSO signal, and configurable to add a subset of wavelengths to the second set of multiplexed wavelengths to form an adapted second FSO signal. In some examples, the first wavelength selective device and the second wavelength selective device may comprise a splitter or a filter.

The FSO network node 300 further comprises a first transmitting module 330*a* configured to transmit the adapted first FSO signal and a second transmitting module 330*b* configured to transmit the adapted second FSO signal.

In some examples, the first wavelength selective device 320*a* may be further configurable to drop a subset of wavelengths from the first set of multiplexed wavelengths to form the adapted first FSO signal and the second wavelength selective device 320*b* may be further configurable to drop a subset of wavelengths from the second set of multiplexed wavelengths to form the adapted second FSO signal. In some examples, the first wavelength selective device 320*a* and the second wavelength selective device 320*b* may comprise a splitter or a filter configured to drop the subset of wavelengths from the first set of multiplexed wavelengths and to drop the subset of wavelengths from the second set of multiplexed wavelengths, respectively.

In some examples, the FSO node 300 may be configured in a ring network, such that the first receiving module 310*a* may be configured to receive the first FSO signal from a first adjacent FSO network node and the second receiving module 310*b* may be configured to receive the second FSO signal from a second adjacent FSO ring network node. The first transmitting module 330*a* may be configured to transmit the adapted first FSO signal to the second adjacent FSO ring network node and the second transmitting module 330*b* may be configured to transmit the adapted second FSO signal to the first adjacent FSO network node. The ring network may comprise a hub node, such as FSO network node 200, and one or more slave nodes, such as FSO network nodes 300. The FSO network node 300 is not configured to block a wavelength. The FSO network node 200, comprises the functionality to block one or more wavelengths.

Figure 4:
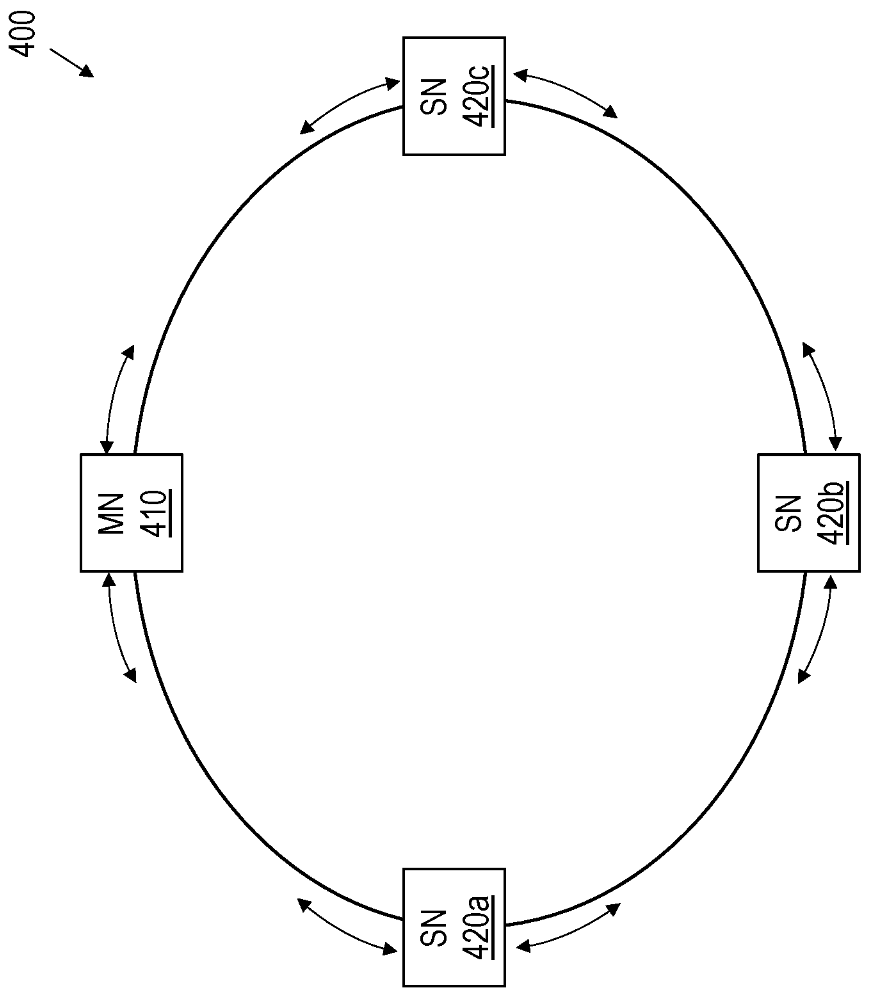
FIG. 4 is another example of an FSO network.

FIG. 4 is a schematic example of an FSO network 400. FSO network 400 comprises a master node 410 and first, second and third slave nodes 420*a-c*. Those skilled in the art will appreciate that more than one master nodes and any number of slave nodes may be included in the network without departing from the scope of the disclosure. The FSO network 400 may be implemented as a fronthaul and/or backhaul network for a mobile communication system. In the illustrated example of FIG. 4, master node 410 and first, second and third slave nodes 420*a-c* are configured in a ring network architecture.

In some examples, master node 410 may comprise an FSO network node 200 described above with respect to FIG. 2 and may therefore be operable to provide at least some of the above-described functionality relating to FSO network node 200. In some examples, first, second and third slave nodes 420*a-c* may each comprise the FSO network node 300 described above with respect to FIG. 3 and may therefore be operable to provide at least some of the above-described functionality relating to FSO network node 300.

First, second and third slave nodes 420*a-c* are configured to transmit FSO signals in both directions around the ring network 400. For example, first slave node 420*a* may transmit a first FSO signal in a clockwise direction around FSO network 400 and a second FSO signal in an anti-clockwise direction around the FSO network 400. Second slave node 420*b* and third slave node 420 may be configured to act on an FSO signal, to add a subset of wavelengths to the FSO signal to form an adapted FSO signal. For example, second slave node 420*b* may act on the second FSO signal transmitted by first slave node 420*a* to add a subset of wavelengths to form an adapted second FSO signal and transmit the adapted second FSO signal to the third slave node 420*c*. Third slave node 420*c* may further be configured to add a further subset of wavelengths to the adapted second FSO signal and transmit the further adapted second FSO signal to the master node 410. It will therefore be appreciated that first, second or third slave nodes may be further configured to pass wavelengths, which are present in the FSO signals during the operation to add wavelengths to the FSO signals. In another example, first, second or third slave nodes may not add any wavelengths to a FSO signals and may instead simply pass the FSO signal and therefore the wavelengths present in the FSO signal.

As will be described in more detail below, in order to increase link reliability in FSO network 400, each slave node 420*a-c* may be configured to add the same subset of wavelengths to the FSO signals transmitted in each direction around the FSO network 400. For example, first slave node 420*a* may add the same subset of wavelengths to the first FSO signal transmitted in the clockwise direction and the second FSO signal transmitted in the anti-clockwise direction. Second slave node 420*b* and third slave node 420 may be configured to perform a corresponding operation and, as such, master node 410 may be configured to receive all wavelengths transmitted by the first, second and third slave nodes 420*a-c* travelling in both directions around the FSO network 400.

Therefore, master node 410 may be configured to receive a first FSO signal, for example from the clockwise direction, and receive a second FSO signal, for example from the anti-clockwise direction. Thus, in some examples, an FSO network node may be configured in a ring network and a first receiving module of the FSO network node may receive the first FSO signal from a first adjacent FSO ring network node, and a second receiving module of the FSO network node may receive the second FSO signal from a second adjacent FSO ring network node.

It will be appreciated that master node 410 may receive all wavelengths transmitted from the first, second and third slave nodes 420*a-c* in both directions. However, due to the locations of the slave nodes 420*a-c*, the links between the slave nodes 420*a-c* and the links between the slave nodes 420*a-c* and the master node 410, one wavelength received from one direction at the master node 410 may be received at the same or a similar time as (but out of synchronization with) the same wavelength received from the opposite direction.

For example, first slave node 420*a* may be configured to add a wavelength to a first FSO signal transmitted from the first slave node 420*a* in the clockwise direction and add the same wavelength to a second FSO signal transmitted from the first slave node 420*a* travelling in the anti-clockwise direction. Due to the location of the first slave node 420*a*, the first FSO signal may be received at the master node 410 before the second FSO signal, due to the increased distance that the second signal needs to travel to reach the master node 410. In some examples, if the wavelength received in the first FSO signal and the same wavelength received in the second FSO signal were both dropped for further processing by the master node 410, this may cause interference.

Therefore, in some examples, master node 410 may be configured to drop a wavelength received from either direction and block the corresponding wavelength subsequently received from the other direction. As described above, master node 410 may comprise first and second wavelength selective devices configured to perform the drop and block operations. The dropped wavelength may thus be transmitted to, for example, a component within the master node, another network node, e.g. in the radio access network, or the core network for further processing, whereas the blocked wavelength may not be transmitted for further processing. For example, the blocked wavelength may be terminated by directing the blocked wavelength to a module where the blocked wavelength is not transmitted to a photodiode configured to receive the dropped wavelengths. In this way, interference due to the processing of corresponding wavelengths may be at least partly mitigated.

Thus, in some examples, the first wavelength selective device may be configured to block a third subset of wavelengths from the first set of multiplexed wavelengths corresponding to the second subset of wavelengths dropped by the second wavelength selective device and the second wavelength selective device may be configured to block a fourth subset of wavelengths from the second set of multiplexed wavelengths corresponding to the first subset of wavelengths dropped by the first wavelength selective device.

In the example illustrated in FIG. 4, where the FSO network 400 comprises only one master node 410, the master node 410 may be configured to drop or block all wavelengths received at the master, depending on the direction from which the master node 410 first received a given wavelength. However, in other examples, FSO network 400 may comprise a plurality of master nodes. In such examples, each master node may be configured to drop and block a subset of the wavelengths transmitted around the network by the slave nodes 420*a-c* and may further be configured to, for example by using their respective wavelength selective devices, to pass wavelengths that a master node is not operating to drop and block.

For example, one master node may be configured to drop and block the wavelengths added by first slave node 420*a* and a second master node may be configured to drop and block the wavelengths added by second slave node 420*b*. In such examples, the first master node may be configured to pass the wavelengths added to FSO signals by the second slave node 420*b*, as these may be dropped and blocked by the second master node. The second master node may thus be configured to pass wavelengths added to FSO signals by the first slave node 420*a*, as these may be dropped and blocked by the first master node.

Therefore, a wavelength selective device of a master node may be configured to drop or block a wavelength depending on the time at which a wavelength is received at the master node. A wavelength selective device of a master node may be further configured to pass a wavelength, which the master node is not configured to drop or block.

As described above, reliability of FSO network links has limited the use of FSO network technology. Examples according to the present disclosure may thus increase the reliability of transmissions in an FSO network being received at their intended node.

As described above, master node 410 may be configured to receive a wavelength transmitted from a slave node travelling in both the clockwise and anti-clockwise directions around the FSO ring network 400. The master node 410 may be further configured to drop the wavelength received from one direction for further processing and block the corresponding wavelength subsequently received at the master node 410 from the opposite direction.

For example, a wavelength may first be received from the clockwise direction and dropped for further processing, whereas the corresponding wavelength subsequently received from the anti-clockwise direction may be blocked. However, in some examples, a line-of-sight (LOS) blockage or link failure may occur in one of the FSO links. For example, an LOS blockage may occur between the first network node 420*a* and the master node 410. In such examples, a first signal transmitted by the first slave node 420*a* in the clockwise direction may not be received at the master node 410.

In some examples, master node 410 may thus comprise a controller configured to monitor a first subset of wavelengths received at the first receiving module. Responsive to the first receiving module not receiving at least one first wavelength of the first subset of wavelengths, the controller is configured to: control the first wavelength selective device to block the at least one first wavelength; and control the second wavelength selective device to drop a wavelength from the second set of multiplexed wavelengths corresponding to the at least one first wavelength. In some examples, the controller may be further configured to: monitor the second subset of wavelengths received at the second receiving module. Responsive to the second receiving module not receiving at least one second wavelength of the second subset of wavelengths, the controller may be configured to: control the second wavelength selective device to block the at least one second wavelength and control the first wavelength selective device to drop a wavelength from the first set of multiplexed wavelengths corresponding to the at least one second wavelength.

For example, the first receiving module may be configured to receive wavelengths travelling to the master node 410 in the clockwise direction. The first receiving module not detecting a wavelength may be indicative of a LOS blockage or other link failure occurring in the clockwise direction towards master node 410. As the master node may also receive the corresponding wavelength from the anti-clockwise direction, the master node may thus drop the wavelength received from the anti-clockwise direction for further processing. In this way, reliability issues associated with link failures that may occur in FSO network 400 may be at least partly mitigated.

In some examples, responsive to the LOS blockage or FSO link failure being removed, a wavelength may again be received at the master node 410 travelling from the clockwise direction before the corresponding wavelength travelling in the anti-clockwise direction. As such, the controller may effectively toggle the first and second wavelength selective devices such that the wavelength first received from the clockwise direction is dropped for further processing and the wavelength subsequently received from the anti-clockwise direction is blocked.

As illustrated in FIG. 4, master node 410 is further configured to transmit FSO signals in clockwise and anti-clockwise directions around the FSO network 400. For example, the wavelengths dropped by the master node 410 may be processed by the core network and signals may be generated for transmission back to the slave nodes 420*a-c* in response (e.g., comprising an acknowledgement message or other response to the data received in the dropped wavelength). In some examples, for wavelengths dropped by the master node 410 received from one direction, the master node 410 may be configured to transmit a response FSO signal comprising a set of wavelengths in the opposite direction.

For example, the master node 410 may drop one wavelength received from the clockwise direction. The master node 410 may thus be configured to transmit an FSO signal in the anti-clockwise direction in response to the dropped wavelength, for example, as a response signal from the core network. As the wavelength may have been first received from one direction, the master node may thus determine that sending a response signal back in the direction from which the wavelength was received may enable the signal to reach the appropriate slave node with lower latency than transmitting the response signal in the same direction again.

The master node 410 may thus be configured to drop a first subset of wavelengths received in a first FSO signal, for example from the clockwise direction from a first adjacent FSO node, and drop a second subset of wavelengths received in a second FSO signal, for example, from the anti-clockwise direction from a second adjacent FSO node. Therefore, in some examples, master node 410 may comprise a first transmitting module configured to transmit a third FSO signal comprising a third set of multiplexed wavelengths and a second transmitting module configured to transmit a fourth FSO signal comprising a fourth set of multiplexed wavelengths. The third FSO signal may be transmitted in response to the first FSO signal and the third set of multiplexed wavelengths may be associated with the first set of multiplexed wavelengths and the fourth FSO signal may be transmitted in response to the second FSO signal and the fourth set of multiplexed wavelengths may be associated with the second set of multiplexed wavelengths. In some examples, the first transmitting module may be configured to transmit the third FSO signal to the first adjacent FSO ring network node, which transmitted the first FSO signal and the second transmitting module may be configured to transmit the fourth FSO signal, to the second adjacent FSO ring network node, which transmitted the second FSO signal.

In some examples, the third set of multiplexed wavelengths may comprise a different set of wavelengths than the first set of multiplexed wavelengths and the fourth set of multiplexed wavelengths may comprise a different set of wavelengths than the second set of multiplexed wavelengths. In such examples, full duplex communication can thus occur over a FSO link. For example, considering the C-band spectrum comprising 96 channels, examples according to the present disclosure may thus provide 48 full duplex channels over an FSO network.

In some examples, the master node 410 may comprise a third wavelength selective device configured to select the third set of multiplexed wavelengths of the third FSO signal and the fourth set of multiplexed wavelengths of the fourth FSO signal. As described above, responsive to a LOS blockage or link failure resulting in a wavelength not being received at a first receiving module of the master node 410, which would have been dropped, the master node is configured to toggle the first and second wavelength selective devices such that the corresponding wavelength received on the second receiving module is dropped for further processing. In a similar manner, responsive to the controller not detecting at least one first wavelength of the first subset of wavelengths, the controller may be further configured to control the third wavelength selective device to remove a wavelength from the third set of multiplexed wavelengths associated with the at least one first wavelength and add a wavelength to the fourth set of multiplexed wavelengths associated with the at least one first wavelength. In some examples, responsive to the controller not detecting at least one second wavelength of the second subset of wavelengths of a second FSO signal, the controller may be further configured to control the third wavelength selective device to remove a wavelength from the fourth set of multiplexed wavelengths associated with the at least one second wavelength and add a wavelength to the third set of multiplexed wavelengths associated with the at least one first wavelength.

A wavelength transmitted by, for example, first slave node 420*a*, not being received at the first receiving module may be indicative that a LOS blockage or link failure has occurred in the clockwise direction around the network. As such, a corresponding wavelength transmitted from the master node 410 on the same link in the anti-clockwise direction may not be reliably received by first slave node 420*a*. In some examples the master node 410 may therefore be configured to add the wavelength, for transmission to the first slave node 420*a*, to the fourth signal transmitted in the clockwise direction around the network, as this direction of transmission may be more reliable than the anti-clockwise direction of transmission. The master node 410 may thus, at the same time, remove the corresponding wavelength from the third FSO signal transmitted in the anti-clockwise direction, as this may be a redundant transmission wasting network resources. In some examples, if the corresponding wavelength were also transmitted in the third signal, this wavelength may be received at, for example first slave node 420*a*, in addition to the wavelength of the fourth signal, which may thus cause interference at first slave node 420*a*.

Figure 5:
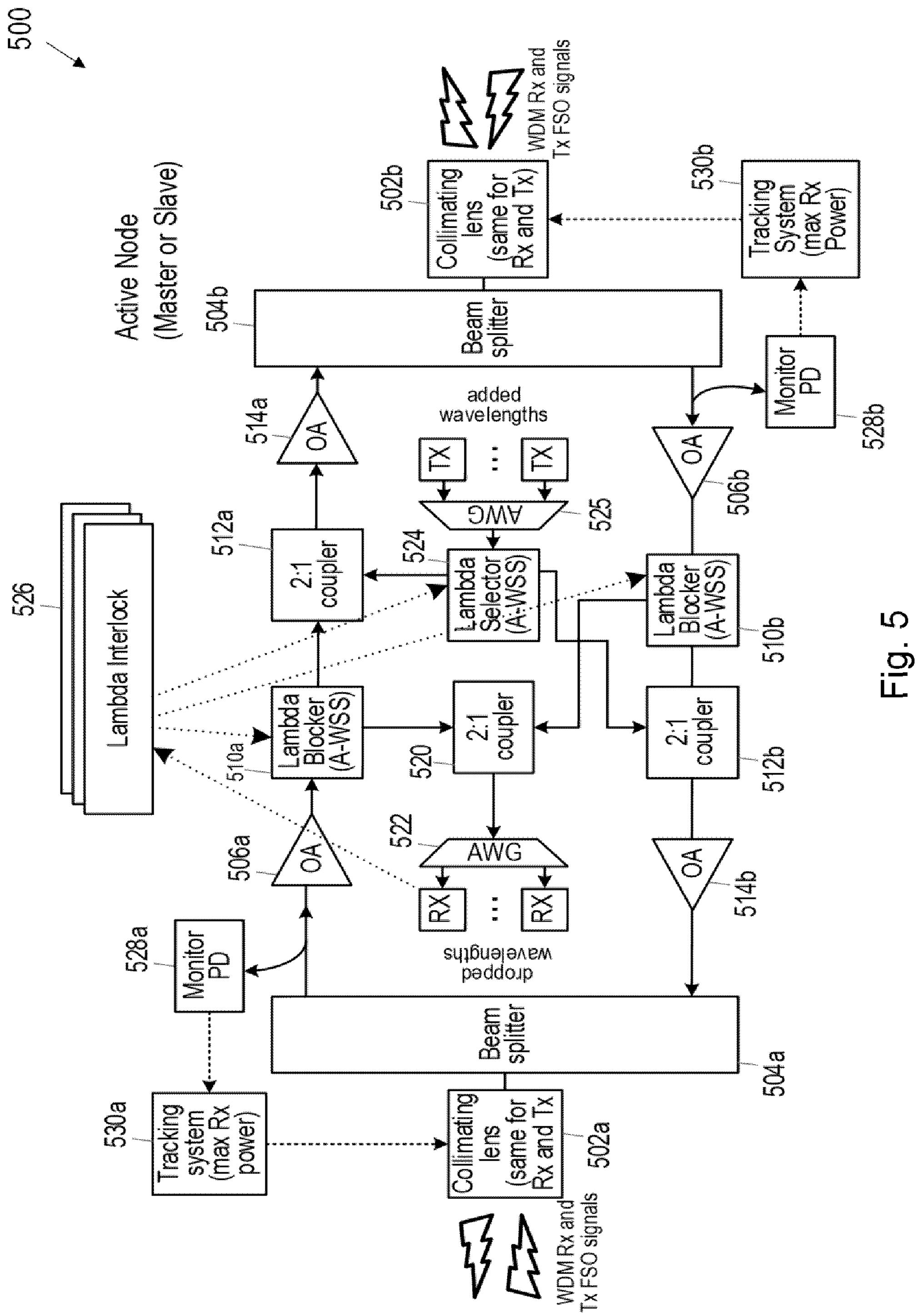
FIG. 5 is an example of an active FSO node.

FIG. 5 illustrates example modules in an active FSO network node 500. In some examples, the master node 410 or the slave nodes 420*a-c* of FIG. 4 may comprise the active FSO network node 500. Active FSO network node 500 may therefore comprise at least some of the functionality of the master node or slave nodes described above with reference to FIG. 4, and/or described above with respect to FIGS. 2 and 3.

FSO network node 500 comprises a first and second collimating modules configured to collimate FSO signals comprising a set of multiplexed wavelengths to downstream modules. In the illustrated example of FIG. 5, first collimating module comprises a first collimating lens 502*a* and second collimating module comprises a second collimating lens 502*b*. First and second collimating lenses 502*a*, 50*b* are each configured to receive and transmit respective FSO signals. In one example, first collimating lens 502*a* may be configured to receive a first FSO signal comprising a first set of multiplexed wavelengths and second collimating lens 502*b* may be configured to receive a second FSO signal comprising a second set of multiplexed wavelengths. In other examples, first and/or second collimating lenses 502*a*, 502*b*, may be replaced with alternative collimating modules, such as, by respective collimating mirror systems. In other examples the first and second collimating modules may comprise a combination of collimating lenses and mirrors.

Active FSO network node 500 further comprises a first beam splitter 504*a* and a second beam splitter 504*b* configured to receive FSO signals from first collimating lens 502*a* and second collimating lens 502*b*, respectively. Active FSO network node 500 further comprises a first optical amplifier 506*a* which is configured to receive, for example, a first FSO signal from first beam splitter 504*a* and a second optical amplifier 506*b* configured to receive, for example a second FSO signal from second beam splitter 506*b*.

As described above, a node of an FSO network may comprise first and second receiving modules configured to receive FSO signals. In some examples, the first receiving module may comprise a first collimating module, such as first collimating lens 502*a* and the second receiving module may comprise a second collimating module, such as, second collimating lens 502*b*. In other examples, the first receiving module may comprise the first collimating module, first beam splitter 504*a* and first optical amplifier 506*a* and the second receiving module may comprise the second collimating module, second beam splitter 504*b* and second optical amplifier 506*b*. In examples according to the present disclosure, a receiving module may thus comprise a module comprised of a single element or multiple elements that may be configured to receive a FSO signal comprising a plurality of multiplexed wavelengths and transmit the FSO signal to downstream modules to carry out at least some processing of the FSO signal in the optical domain.

Active FSO network node 500 further comprises a first wavelength selective device, which in the illustrated example of FIG. 5 comprises first air wavelength selective switch (A-WSS) 510*a* configured to receive an amplified FSO signal from first optical amplifier 506*a*. Active FSO network node further comprises first 2:1 optical coupler 512*a*. As will be described in more detail below, first A-WSS 510*a* may be configured to drop, block or pass wavelengths from a first FSO signal and first 2:1 coupler 512*a* may be configured to add wavelengths to a first FSO signal or configure a new FSO signal.

Active FSO network node 500 further comprises third optical amplifier 514*a* configured to receive the FSO signal output from first 2:1 coupler 512*a*, which in some examples may comprise an adapted FSO signal. Third optical amplifier 514*a* is thus configured to amplify an FSO signal and transmit the amplified FSO signal to second collimating lens 502*b* via second beam splitter 504*b*. Second collimating lens 502*b* is thus further configured to transmit the FSO signal to an FSO network node.

As described above, active FSO network node 500 further comprises a second optical amplifier 506*b* configured to receive, for example, a second FSO signal comprising a second set of multiplexed wavelengths from the second collimating lens 502*b*. Second optical amplifier 506*b* is further configured to transmit the amplified second FSO signal to a second wavelength selective device, which n the example of FIG. 5 comprises a second A-WSS 510*b*. Active FSO network node 500 further comprises a second 2:1 coupler 512*b*. As will be described in more detail below, second A-WSS 510*b* may be configured to drop, block or pass wavelengths from a second FSO signal and second 2:1 coupler 512*b* may be configured to add wavelengths to a second FSO signal or configure a new FSO signal.

Active FSO network node 500 further comprises fourth optical amplifier 514*b* configured to amplify the FSO signal output from second 2:1 coupler 512*b*. The amplified FSO signal is transmitted to first collimating lens 502*a* via first beam splitter 504*a*. First collimating lens 502*a* is thus further configured to transmit an FSO signal to an FSO network node.

As described above, a node of an FSO network may comprise first and second transmitting modules configured to transmit FSO signals. In some examples, the first transmitting module may comprise the first collimating lens 502*a* and the second transmitting module may comprise the second collimating lens 502*b*. In other examples, the first transmitting module may comprise first collimating lens 502*a*, first beam splitter 504*a* and fourth optical amplifier 514*b* and the second transmitting module may comprise second collimating lens 502*b*, second beam splitter 504*b* and third optical amplifier 514*a*. In examples according to the present disclosure, a transmitting module may thus comprise a module comprised of a single element or multiple elements that may be configured to receive a FSO signal comprising a plurality of multiplexed wavelengths and transmit the FSO signal to another FSO network node over an FSO link.

Active FSO network node 500 further comprises third 2:1 optical coupler 520, which as will be described in more detail below communicates dropped wavelengths to first waveguide grating (AWG) 522, which may be further configured to transmit dropped wavelengths for further processing. Active FSO network node 500 further comprises a third wavelength selective device, which in the example of FIG. 5 comprises a third A-WSS 524. As will be described in more detail below, in combination with first and second 2:1 couplers 512*a*, 512*b*, third A-WSS may be configured to add wavelengths to FSO signals.

In one example, active FSO network node 500 comprises an active slave node, which may thus be configured to provide at least some of the functionality of any of slave nodes 420*a-c* described above with respect to FIG. 4.

In such examples, first collimating lens 502*a* may receive a first FSO signal, comprising a first set of multiplexed wavelengths, from a first adjacent network node. The first FSO signal is transmitted to first optical amplifier 506*a* via first beam splitter 504*a*. First optical amplifier 506*a* is configured to amplify the first FSO signal, which is subsequently transmitted to first A-WSS 510*a*. First A-WSS may be configured to drop a first subset of wavelengths from the first FSO signal and the dropped wavelengths are transmitted to second 2:1 coupler 520. First A-WSS 510*a* may be further configured to pass at least some wavelengths of the first FSO signal, which are not part of the subsets of wavelengths which are dropped.

Third A-WSS 524 receives wavelengths from second AWG 525 to be added to the first FSO signal. First 2:1 optical coupler 512*a* may thus receive the wavelengths to be added from the third A-WSS 524 and adds the wavelengths to the first FSO signal. Thus, in some examples, the operation of first A-WSS 510*a*, first 2:1 coupler 512*a* and third A-WSS 524, may act on the first FSO signal to add, drop or pass a subset of wavelengths from the first set of multiplexed wavelengths to form an adapted first FSO signal.

The third optical amplifier 514*a* may thus amplify the adapted first FSO signal for transmission to, for example, a second adjacent FSO network node via second collimating lens 502*b*.

In a similar manner, a second FSO signal comprising a second set of multiplexed wavelengths may be received at second collimating 502*b* from the second adjacent FSO network node. The second FSO signal may thus be amplified by second optical amplifier 506*b*. Second A-WSS 510*b*, second 2:1 coupler 512*b* and third A-WSS 524, may act on the second FSO signal to add, drop or pass a subset of wavelengths from the second set of multiplexed wavelengths to form an adapted second FSO signal, in a similar manner to the first FSO signal, described above.

The fourth optical amplifier 514*b* may thus amplify the second adapted FSO signal for transmission to, for example, a first adjacent FSO network node via first collimating lens 501*b*.

Thus, when active FSO node 500 is configured as a slave node, active FSO node 500 may be configured to receive, adapt and transmit FSO signals in the optical domain and avoid optical-to-electrical-to-optical conversion of a signal.

In another example, active FSO network node 500 comprises an active master node, which may thus be configured to provide at least some of the functionality of master node 410 described above with respect to FIG. 4.

In such examples, first collimating lens 502*a* may receive a first FSO signal comprising a first set of multiplexed wavelengths from a first adjacent network node. The first FSO signal is transmitted to first optical amplifier 506*a* via first beam splitter 504*a*. First optical amplifier 506*a* is configured to amplify the first FSO signal, which is subsequently transmitted to first A-WSS 510*a*. In a similar manner, second collimating lens 502*b* may receive a second FSO signal comprising a second set of multiplexed wavelengths from a second adjacent FSO network node. Second optical amplifier 506*b* is configured to amplify the second FSO signal and transmit the amplified second FSO signal to second A-WSS 510*b*.

First A-WSS 510*a* may be configured to drop a first subset of wavelengths from the first FSO signal. The dropped first subset of wavelengths are received at third 2:1 coupler and transmitted to first AWG 522. First A-WSS 510*a* may be further configured to pass at least some wavelengths from the first FSO signal which are not part of the subset of wavelengths, which are dropped. In a similar manner, second A-WSS 510*b* may be configured to drop a second subset of wavelengths from the second FSO signal. The dropped second subset of wavelengths are received at third 2:1 coupler and transmitted to first AWG 522. Second A-WSS 510*b* may be further configured to pass at least some wavelengths from the second FSO signals which are not part of the subset of wavelengths, which are dropped.

Active FSO network node 500 further comprises controller 526, which is configured to monitor the first and second subset of dropped wavelengths received at first AWG 522. To provide loop avoidance, for a given wavelength first received and dropped from either the first or second FSO signal, controller 526 may control first and second A-WSS 510*a*, 510*b*, such that a corresponding wavelength subsequently received in the other of the first or second FSO signals is blocked, such that the subsequently received wavelength is not dropped and prevented from reaching first AWG 522. For example, controller 526 may monitor first AWG 522 and determine that a given wavelength was first received in the first FSO signal and dropped by first A-WSS 510*a*. The controller 526 may thus control second A-WSS 510*b* such that a corresponding wavelength subsequently received in the second FSO signal is blocked by second A-WSS 510*b* such that the corresponding wavelength is not dropped to first AWG 522. In this way, loop avoidance may be provided.

In some examples, first A-WSS 510*a* and second A-WSS 510*b* may block wavelengths by directing such blocked wavelengths to a wavelength blocker to terminate or absorb the blocked wavelengths such that they are not received at 2:1 coupler 520 and AWG 522. In such examples, first A-WSS 510*a* and second A-WSS 510*b* may comprise a wavelength blocker module, which in one example may comprise a liquid crystal. The absorption properties of the liquid crystal may be adapted depending on the wavelengths that are be blocked, dropped or passed by the first A-WSS 510*a* and second A-WSS 510*b*. First A-WSS 510*a* and second A-WSS 510*b* may thus further comprise a mirror network which may be configured to direct dropped wavelengths to 2:1 coupler 520.

As described above, with reference to FIG. 4, a master FSO node may also be configured to transmit FSO signals in response to the FSO signals received at the master FSO node.

Thus, active FSO node 500 comprises second AWG 525, which may receive wavelengths to be transmitted to slave nodes in the FSO network. Controller 526 is further configured to control the third A-WSS 524 to select and multiplex the wavelengths for transmission via the first or second collimating lens 502*a*, 502*b*. Third A-WSS 524 may thus be configured to pass said wavelengths to the first 2:1 coupler 512*a* or the second 2:1 coupler 512*b* for transmission via the first or second collimating lens 502*a*, 502*b*.

Controller 526 may control the third A-WSS 524 to select and multiplex wavelengths based on the first subset of wavelengths dropped by the first A-WSS 510*a* and the second subset of wavelengths dropped by the second A-WSS 510*b*.

For example, controller 526 may monitor the first subset of wavelengths dropped by the first A-WSS 510*a* and thus received at the first collimating lens 502*a*. Controller 526 may be further configured to control the third A-WSS 524 to select and multiplex a set of wavelengths for transmission in a response FSO signal to the slave nodes, generated in response to the first subset of wavelengths dropped by the first A-WSS 510*a*, and transmit said set of wavelengths to the second 2:1 coupler 541*b* for transmission to a network node via the first collimating lens 502*a*. In one example, as the dropped first subset of wavelengths may be first received at the first collimating lens 502*a*, compared to the second collimating lens 502*b*, the controller 526 may thus determine that the FSO link via the first collimating lens 502*a* for the dropped first subset of wavelengths has improved latency or is more reliable than the FSO link via the second collimating lens 502*b*. Thus, controller 526 may operate third A-WSS to select and multiplex wavelengths, generated in response to the dropped first subset of wavelengths, to be transmitted to second 2:1 coupler 512*b* for transmission to one or more slave nodes via the first collimating lens 502*a*. In one example, the wavelengths selected and multiplexed for transmission in response to the first subset of dropped wavelengths may be termed a third FSO signal.

In a similar manner, controller 526 may monitor the second subset of wavelengths dropped by the second A-WSS 510*b*. The controller 526 may thus further be configured to control the third A-WSS 524 to select and multiplex a set of wavelengths for transmission in a response FSO signal to the slave nodes, generated in response to the second subset of wavelengths dropped by the second A-WSS 510*a*, and transmit said response set of wavelengths to the first 2:1 coupler 512*a* for transmission to a network node via the second collimating lens 502*b*. In one example, the wavelengths selected and multiplexed for transmission in response to the second subset of dropped wavelengths may be termed a fourth FSO signal.

As described above, in some examples a LOS blockage or link failure may occur in the FSO network, resulting in a wavelength not being received at the FSO network node 500.

Thus, controller 526 may be configured to monitor the first subset of wavelengths dropped by the first A-WSS 510*a* and, as such, effectively monitor the first subset of wavelengths received at the first collimating lens 502*a*. Responsive to the controller 526 determining that at least one first wavelength of the first subset of wavelengths is not being received by the first collimating lens 502*a*, the controller 526 is configured to control the first A-WSS 510*a* to block the at least one first wavelength and control the second A-WSS 510*b* to drop a wavelength from the second set of multiplexed wavelengths corresponding to the at least one first wavelength. In this way, the wavelength no longer being received at first collimating lens 502*a*, may be received at the second collimating lens 502*b* and thus may be dropped by the second A-WSS 510*b* for further processing.

In a similar manner, controller 526 may be further configured to monitor the second subset of wavelengths dropped by the second A-WSS 510*b* and, as such, effectively monitor the second subset of wavelengths received at the second collimating lens 502*b*. Responsive to the controller 526 determining that at least one second wavelength of the second subset of wavelengths is not being received by the second collimating lens 502*b*, the controller 526 is configured to control the second A-WSS 510*b* to block the at least one second wavelength and control the first A-WSS 510*a* to drop a wavelength from the first set of multiplexed wavelengths corresponding to the at least one second wavelength.

Responsive to controller 526 determining that at least one wavelength of the first subset of dropped wavelengths or the second subset of dropped wavelengths is not being received at the first or second collimating lens 502*a*, 502*b*, the controller 526 may be further configured to adjust the wavelengths selected and multiplexed by the third A-WSS 524.

For example, responsive to the controller 526 not detecting at least one first wavelength of the first subset of wavelengths dropped by the first A-WSS 510*a*, the controller 526 may be further configured to control the third A-WSS 524 to remove a wavelength associated with the at least one first wavelength from a set of multiplexed wavelengths, for transmission in a response FSO signal, transmitted to the second 2:1 coupler 512*b* for transmission via the first collimating lens 502*a*, and add a wavelength associated with the at least one first wavelength to a set of multiplexed wavelengths, for transmission in a response FSO signal, transmitted to the first 2:1 coupler 512*a* for transmission via the second collimating lens 502*b*.

A wavelength not being received at, for example, the first collimating lens 502*a* may be indicative of a LOS blockage or link failure in the FSO network via the first collimating lens 502*a*. Therefore, responsive to a wavelength not being received at the first collimating lens 502*a*, controller 526 may be configured to control third A-WSS 524 to add a wavelength, for transmission in a response FSO signal, to a set of wavelengths to be transmitted via the second collimating lens 502*b* as the FOS link provided by the second collimating lens 502*b* may be more reliable than the first collimating lens 502*a*, in some examples. Controller 526 may thus further control the third A-WSS 524 to remove a wavelength from a set of wavelengths, for transmission in a response FSO signal, via first collimating lens 502*a*, as transmission of the wavelength via the first collimating lens 502*a* and the second collimating lens 502 may cause interference at a slave node configured to receive (i.e. drop) the wavelength.

In a similar manner, responsive to the controller 526 not detecting at least one second wavelength of the second subset of wavelengths dropped by the second A-WSS 510*b*, the controller 526 may be further configured to control the third A-WSS 524 to remove a wavelength associated with the at least one second wavelength from a set of multiplexed wavelengths transmitted to the first 2:1 coupler 512*a* for transmission via the second collimating lens 502*b*, and add a wavelength corresponding to the at least one second wavelength to a set of multiplexed wavelengths transmitted to the second 2:1 coupler 512*b* for transmission via the first collimating lens 502*a*.

As described above, controller 526 may thus be configured to toggle the wavelengths dropped or blocked by first A-WSS 510*a* and second A-WSS 510*b*, and toggle the wavelengths selected for transmission via the first collimating lens 502*a* and second collimating lens 502*b* by third A-WSS 524, responsive to a wavelength not being received at either of first collimating lens 502*a* or second collimating lens 502*b* by monitoring the wavelengths dropped by first A-WSS 510*a* or second A-WSS 510*b*. In some examples, this control of the first A-WSS 510*a*, second A-WSS 510*b* and third A-WSS 524 by controller 526 may be termed a 'lambda interlocking' mechanism in which the operations of first A-WSS 510*a*, second A-WSS 510*b* and third A-WSS are controlled based on monitoring the wavelengths dropped by the first A-WSS 510*a* and the second A-WSS 510*b*.

Active FSO node 500 further comprises first optical power distribution (PD) monitoring module 528*a* and first optical tracking system 530*a*. First optical PD monitoring module 528*a* and first optical tracking system 530*a* may be configured to adjust the alignment and positioning of first collimating lens 502*a*, for example, to help ensure that an FSO signal is received at the centre of the first collimating lens 502*a*, such that the FSO signal is received with the maximum possible optical power. Active FSO node 500 further comprises second optical PD monitoring module 528*b* and second optical tracking system 530*b*. In a similar manner to first optical PD monitoring module 528*a* and first optical tracking system 530*a*, second optical PD monitoring module 528*b* and second optical tracking system 530*b* may be configured to adjust the alignment and positioning of second collimating lens 502*b*.

Figure 6:
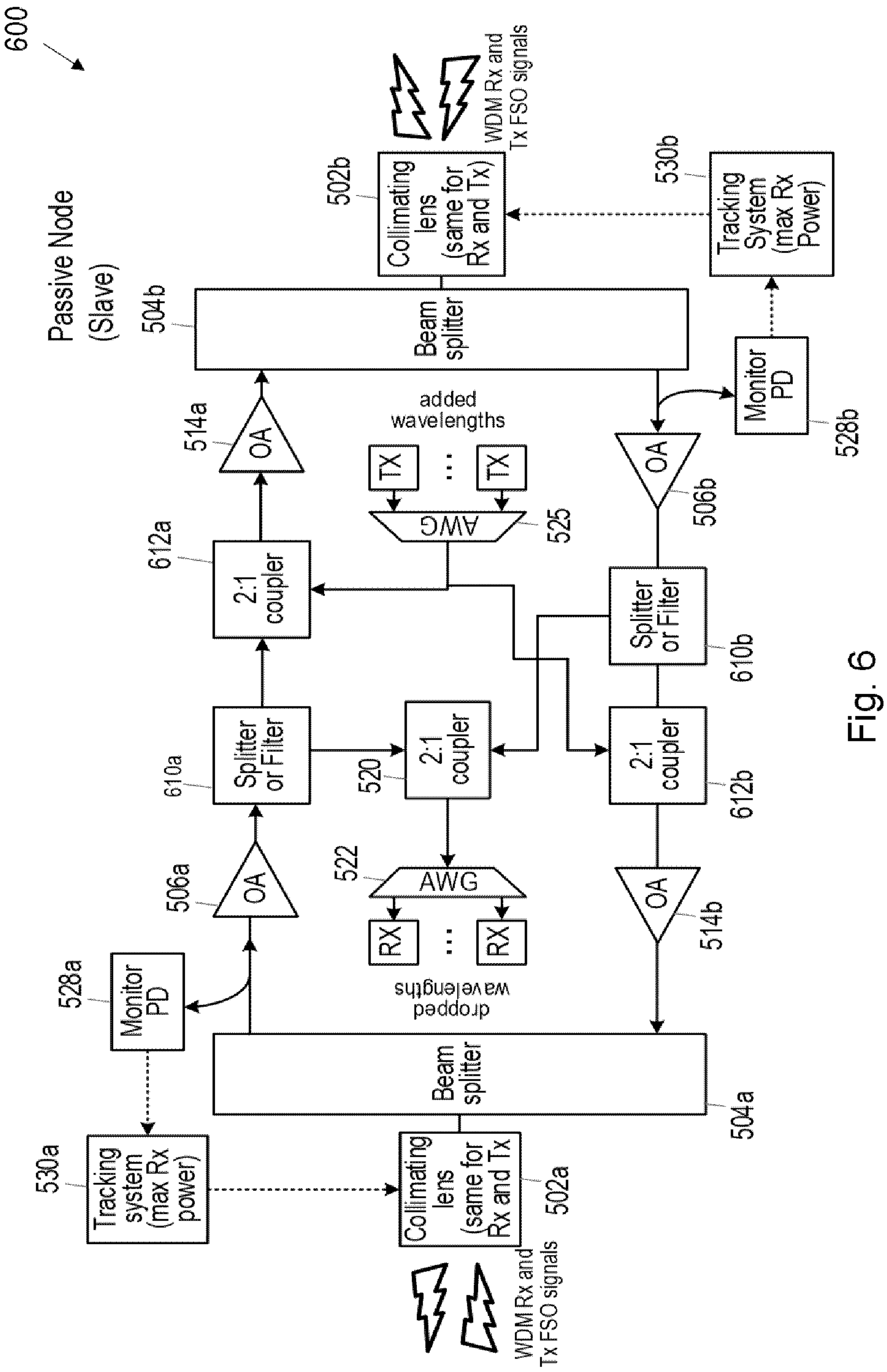
FIG. 6 is an example of a passive FSO node.

FIG. 6 illustrates example modules in a passive FSO network node 600. In some examples, the slave nodes 420*a-c* of FIG. 4 may comprise the passive FSO network node 600. Passive FSO network node 600 may therefore comprise at least some of the functionality of the slave nodes 420*a-c* described above with reference to FIG. 4 and/or described above with respect to FIG. 3.

Passive FSO network node 600 further comprises a number of elements in common with active FSO network node 500, which are labelled with corresponding reference numerals. Elements present in passive FSO network node 600, which are also present in active FSO network node 500 may operate in substantially the same way as described above with reference to FIG. 5 and thus are not discussed in detail below for brevity.

In one example, first collimating lens 502*a* may be configured to receive a first FSO signal and second collimating lens 502*b* may be configured to receive a second FSO signal. Passive node 600 may thus comprise a first optical amplifier 506*a* configured to amplify the first FSO signal and a second optical amplifier 506*b* configured to amplify the second FSO signal.

Passive node 600 further comprises a first wavelength dropping module which in the illustrated example of FIG. 6 comprises a first optical splitter 610*a*. However, in other examples, the first wavelength selective device may instead comprise a first optical filter. Optical splitter 610*a* is configured to drop a first subset of wavelengths from a first FSO signal received, for example at first collimating lens 502*a*. The dropped first subset of wavelengths are thus passed to third 2:1 coupler 520 and transmitted to first AWG 522 for further processing. The first optical splitter 610*a* is further configured to pass the remaining wavelengths of the first FSO signal, which are not dropped.

Passive node 600 further comprises a first optical coupling module, which in the illustrated example of FIG. 6 comprises 2:1 coupler 612*a*, configured to add a subset of wavelengths to a FSO signal. First optical coupling module may thus further comprise second AWG 525, which is configured to transmit the wavelengths to the first 2:1 coupler 612*a* to be added to the first FSO signal.

First optical splitter 610*a* and first 2:1 coupler 612*a* may thus be configured to act on a first FSO signal comprising a first set of multiplexed wavelengths and configured to add wavelengths to and/or drop wavelengths from the first set of multiplexed wavelengths to form an adapted first FSO signal. The adapted first FSO signal may thus be transmitted by the second collimating lens 502*b* for transmission to an FSO network node.

Passive node 600 further comprises a second wavelength dropping module, which in the illustrated example of FIG. 6 may comprise a second optical splitter 610*b*. However, in other examples, the second wavelength dropping module may instead comprise a second optical filter. Optical splitter 610*b* is configured to drop a second subset of wavelengths from a second FSO signal received, for example at second collimating lens 502*b*. The dropped second subset of wavelengths are thus passed to third 2:1 coupler 520 and transmitted to second AWG 522 for further processing. The second optical splitter 610*b* is further configured to pass the remaining wavelengths of the second FSO signal, which are not dropped.

Passive node 600 further comprises a second optical coupling module, which in the illustrated example of FIG. 6 comprises 2:1 coupler 612*b*, configured to add a subset of wavelengths to a FSO signal. Second optical coupling module may thus further comprise second AWG 525, which is configured to transmit the wavelengths to the second 2:1 coupler 612*b* to be added to the second FSO signal.

Second optical splitter 610*a* and second 2:1 coupler 612*b* may thus be configured to act on a second FSO signal comprising a second set of multiplexed wavelengths and configured to add wavelengths to and/or drop wavelengths from the second set of multiplexed wavelengths to form an adapted second FSO signal. The adapted second FSO signal may thus be transmitted by the first collimating lens 502*a* for transmission to an FSO network node.

As described above, passive node 600 may be configured to transmit the same wavelengths in each direction around an FSO ring network. As such, AWG 525 may thus be configured, for example with a bi-splitter prism, to transmit the same wavelengths to first and second 2:1 couplers 612*a*, 612*b*, to be added to the adapted first and second FSO signals, respectively. Thus, in some examples, passive node 600 may comprise a splitter configurable to add the subset of wavelengths to the first set of multiplexed wavelengths to form the adapted first FSO signal and configurable to add the subset of wavelengths to the second set of multiplexed wavelengths to form the adapted second FSO signal. Passive node 600 may further comprise a mirror system configured to direct the wavelengths to first and second 2:1 couplers 612*a*, 612*b*.

Figure 7:
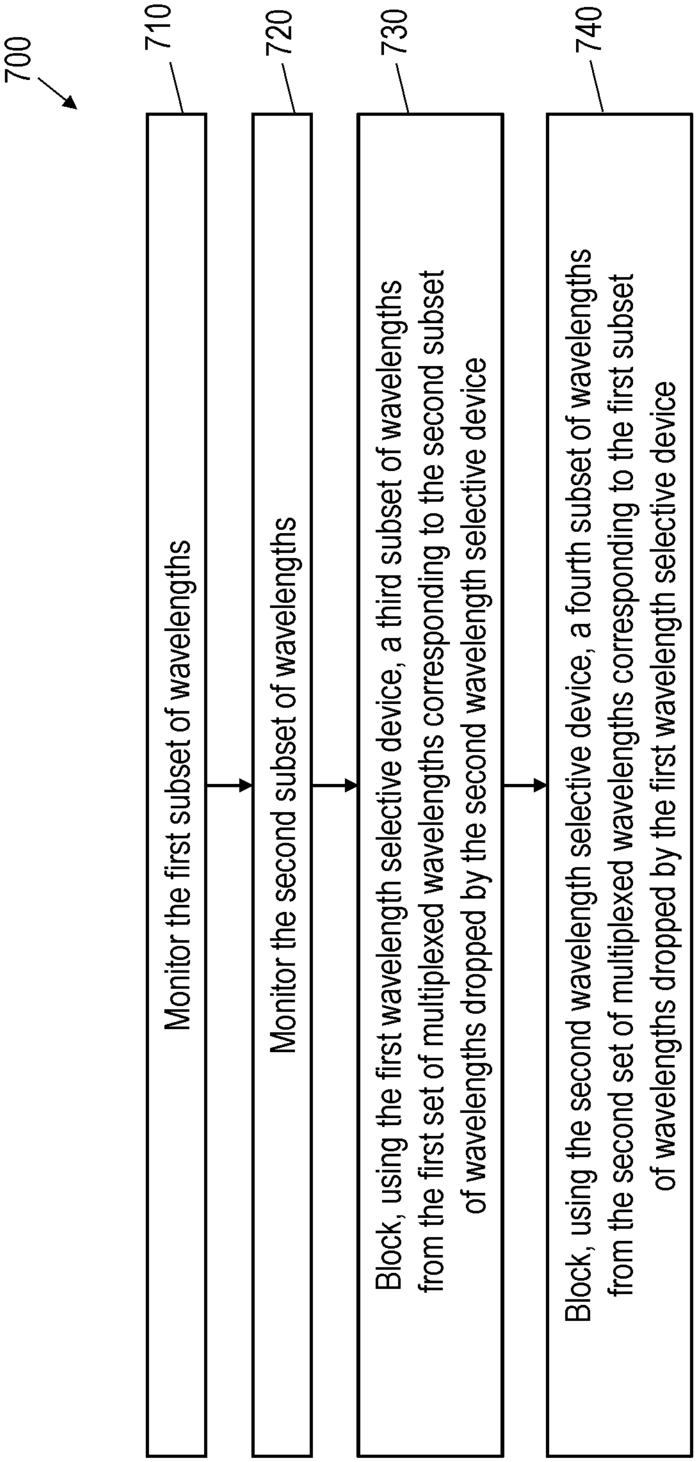
FIG. 7 is a flowchart illustrating process steps in a method performed by a FSO network node.

FIG. 7 is a flowchart illustrating process steps in a method 700 performed by a FSO network node. For example, FSO network node 200, master FSO network node 410 or active FSO network node 500. The FSO network node comprises a first receiving module configured to receive a first FSO signal comprising a first set of multiplexed wavelengths, a second receiving module configured to receive a second FSO signal comprising a second set of multiplexed wavelengths, a first wavelength selective device configured to drop a first subset of wavelengths from the first set of multiplexed wavelengths and a second wavelength selective device configured to drop a second subset of wavelengths from the second set of multiplexed wavelengths.

The method 700 comprises, in step 710, monitoring the first subset of wavelengths received at the first receiving module and, in step 720, monitoring the second subset of wavelengths received at the second receiving module. The method 700 further comprises, in step 730, blocking, using the first wavelength selective device, a third subset of wavelengths from the first set of multiplexed wavelengths corresponding to the second subset of wavelengths dropped by the second wavelength selective device and, in step 740, blocking, using the second wavelength selective device, a fourth subset of wavelengths from the second set of multiplexed wavelengths corresponding to the first subset of wavelengths dropped by the first wavelength selective device.

In some examples, the method 700 may further comprise, responsive to not receiving at least one first wavelength of the first subset of wavelengths at the first receiving module, blocking, using the first wavelength selective device, the at least one first wavelength; and dropping, using the second wavelength selective device, a wavelength from the second set of multiplexed wavelengths corresponding to the at least one first wavelength.

In some examples, the method 700 may further comprise responsive to not receiving at least one second wavelength of the second subset of wavelengths at the second receiving module, blocking, using the second wavelength selective device, the at least one second wavelength; and dropping, using the first wavelength selective device, a wavelength from the first set of multiplexed wavelengths corresponding to the at least one second wavelength.

Examples according to the present disclosure thus provide an FSO network comprising FSO network nodes that are configured to add and drop wavelengths from FSO signals solely in the optical domain. This avoids optical-to-electrical-to-optical conversion of the FSO signals at a node, thus improving the efficiency of an FSO network. Due to the functionality to drop and add wavelengths to an FSO signal, examples according to the present disclosure, thus provide asymmetric FSO multicasting over a single protected wavelength.

Examples according to the present disclosure further provide a master FSO network node, which is operable to control first and second wavelength selective devices to provide loop avoidance thus mitigating for interference that may be caused by a loop. The discrete optical components of a master FSO network node according to the present disclosure are configurable to provide loop avoidance, which has traditionally been difficult to configure in integrated optical systems.

The master node, according to examples of the present disclosure, is further configured to improve the reliability of the FSO network by providing a mechanism to switch to an alternative FSO link in the event of a LOS blockage or link failure. In response to not receiving a given wavelength at the master node from one receiving module, the master node is configured to drop a corresponding wavelength received at a second receiving module for further processing. The improved reliability of an FSO network according examples of the present disclosure may thus provide a more versatile FSO network, which may be deployed in future networks, such as 6G networks.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A free space optic (FSO) network node comprising:

a first receiving module configured to receive a first FSO signal comprising a first set of multiplexed wavelengths from a first direction and a second receiving module configured to receive a second FSO signal comprising a second set of multiplexed wavelengths from a second direction; and a first wavelength selective device configured to drop a first subset of wavelengths from the first set of multiplexed wavelengths and a second wavelength selective device configured to drop a second subset of wavelengths from the second set of multiplexed wavelengths, wherein the first wavelength selective device is configured to block a fifth subset of wavelengths from the first set of multiplexed wavelengths corresponding to the second subset of wavelengths dropped by the second wavelength selective device; and wherein the second wavelength selective device is configured to block a sixth subset of wavelengths from the second set of multiplexed wavelengths corresponding to the first subset of wavelengths dropped by the first wavelength selective device.

2. The FSO network node according to claim 1, wherein the first wavelength selective device is further configured to pass a third subset of wavelengths from the first set of multiplexed wavelengths and the second wavelength selective device is further configured to pass a fourth subset of wavelengths from the second set of multiplexed wavelengths.

3. The FSO network node according to claim 1, further comprising a controller configured to:

monitor the first subset of wavelengths received at the first receiving module; and responsive to the first receiving module not receiving at least one first wavelength of the first subset of wavelengths, the controller is configured to:

control the first wavelength selective device to block the at least one first wavelength; and control the second wavelength selective device to drop a wavelength from the second set of multiplexed wavelengths corresponding to the at least one first wavelength.

4. The FSO network node according to claim 3, wherein the controller is further configured to:

monitor the second subset of wavelengths received at the second receiving module; and responsive to the second receiving module not receiving at least one second wavelength of the second subset of wavelengths, the controller is configured to:

control the second wavelength selective device to block the at least one second wavelength; and control the first wavelength selective device to drop a wavelength from the first set of multiplexed wavelengths corresponding to the at least one second wavelength.

5. The FSO network node according to claim 1, configured in a ring network and wherein the first receiving module receives the first FSO signal from a first adjacent FSO ring network node and the second receiving module receives the second FSO signal from a second adjacent FSO ring network node.

6. The FSO network node according to claim 1, further comprising a first transmitting module configured to transmit a third FSO signal comprising a third set of multiplexed wavelengths and a second transmitting module configured to transmit a fourth FSO signal comprising a fourth set of multiplexed wavelengths.

7. The FSO network node according to claim 6, wherein the third FSO signal is transmitted in response to the first FSO signal and wherein the third set of multiplexed wavelengths are associated with the first set of multiplexed wavelengths; and wherein the fourth FSO signal is transmitted in response to the second FSO signal and wherein the fourth set of multiplexed wavelengths are associated with the second set of multiplexed wavelengths.

8. The FSO network node according to claim 6, further comprising a third wavelength selective device controlled by a controller, the third wavelength selective device configured to select the third set of multiplexed wavelengths of the third FSO signal and the fourth set of multiplexed wavelengths of the fourth FSO signal.

9. The FSO network node according to claim 8, wherein responsive to the controller not detecting at least one first wavelength of the first subset of wavelengths, the controller is further configured to control a third wavelength selective device to remove a wavelength from the third set of multiplexed wavelengths associated with the at least one first wavelength and add a wavelength to the fourth set of multiplexed wavelengths associated with the at least one first wavelength.

10. The FSO network node according to claim 9, wherein responsive to the controller not detecting at least one second wavelength of the second subset of wavelengths, the controller is further configured to control a third wavelength selective device to remove a wavelength from the fourth set of multiplexed wavelengths associated with the at least one second wavelength and add a wavelength to the third set of multiplexed wavelengths associated with the at least one second wavelength.

11. The FSO network node according to claim 1, wherein the first wavelength selective device comprises a first wavelength selective switch (WSS) and the second wavelength selective device comprises a second WSS and a third wavelength selective device comprises a third WSS.

12. The FSO network node according to claim 1, wherein the first set of multiplexed wavelengths and the second set of multiplexed wavelengths each comprise the same set of wavelengths; and wherein an aggregate of the first subset of wavelengths and the second subset of wavelengths comprises each wavelength of the same set of wavelengths.

13. A method performed by a FSO network node, the FSO network node comprising a first receiving module configured to receive a first FSO signal comprising a first set of multiplexed wavelengths, a second receiving module configured to receive a second FSO signal comprising a second set of multiplexed wavelengths, a first wavelength selective device configured to drop a first subset of wavelengths from the first set of multiplexed wavelengths and a second wavelength selective device configured to drop a second subset of wavelengths from the second set of multiplexed wavelengths, the method comprising:

monitoring the first subset of wavelengths received at the first receiving module;

monitoring the second subset of wavelengths received at the second receiving module;

blocking, using the first wavelength selective device, a third subset of wavelengths from the first set of multiplexed wavelengths corresponding to the second subset of wavelengths dropped by the second wavelength selective device;

blocking, using the second wavelength selective device, a fourth subset of wavelengths from the second set of multiplexed wavelengths corresponding to the first subset of wavelengths dropped by the first wavelength selective device, and responsive to not receiving at least one first wavelength of the first subset of wavelengths at the first receiving module, blocking, using the first wavelength selective device, the at least one first wavelength; and dropping, using the second wavelength selective device, a wavelength from the second set of multiplexed wavelengths corresponding to the at least one first wavelength.

14. The method according to claim 13, further comprising: responsive to not receiving at least one second wavelength of the second subset of wavelengths at the second receiving module, blocking, using the second wavelength selective device, the at least one second wavelength; and dropping, using the first wavelength selective device, a wavelength from the first set of multiplexed wavelengths corresponding to the at least one second wavelength.

* * * * *